US008749723B2

(12) United States Patent
Chen et al.

(10) Patent No.: US 8,749,723 B2
(45) Date of Patent: Jun. 10, 2014

(54) DRIVING METHOD AND DISPLAY SYSTEM UTILIZING THE SAME

(75) Inventors: Shang-Chia Chen, Taipei (TW); Heng-Yin Chen, Yunlin County (TW); Chao-Chiun Liang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 658 days.

(21) Appl. No.: 12/696,505

(22) Filed: Jan. 29, 2010

(65) Prior Publication Data

US 2011/0037911 A1 Feb. 17, 2011

(30) Foreign Application Priority Data

Aug. 13, 2009 (TW) ................................ 98127222 A

(51) Int. Cl.
*G02F 1/135* (2006.01)

(52) U.S. Cl.
USPC ................................................ 349/24; 349/61

(58) Field of Classification Search
USPC ....................................................... 349/24, 61
See application file for complete search history.

(56) References Cited

U.S. PATENT DOCUMENTS

| | | | | |
|---|---|---|---|---|
| 6,268,893 | B1 * | 7/2001 | O'Boyle et al. | 349/2 |
| 6,356,323 | B1 | 3/2002 | Petruchik | |
| 6,882,401 | B2 | 4/2005 | Harada et al. | |
| 7,190,417 | B2 | 3/2007 | Harada et al. | |
| 2007/0139299 | A1 | 6/2007 | Huang et al. | |

* cited by examiner

*Primary Examiner* — Lucy Chien
(74) *Attorney, Agent, or Firm* — Birch, Stewart, Kolasch & Birch, LLP

(57) ABSTRACT

A driving method for a panel structure including at least two liquid crystal layers is disclosed. The liquid crystal layers display different colors. When the panel structure includes a first liquid crystal layer and a second liquid crystal layer, the first and the second liquid crystal layers are initialized. A light source is utilized to emit the first and the second liquid crystal layers to write data to at least one of the first and the second liquid crystal layers. When the panel structure further includes a third liquid crystal layer, the first, the second and the third liquid crystal layers are first initialized. A light source is utilized to emit the first, the second and the third liquid crystal layers to write data to at least one of the first, the second and the third liquid crystal layers.

23 Claims, 11 Drawing Sheets

DRIVING METHOD AND DISPLAY SYSTEM UTILIZING THE SAME

CROSS REFERENCE TO RELATED APPLICATIONS

This Application claims priority of Taiwan Patent Application No. 098127222, filed on Aug. 13, 2009, the entirety of which is incorporated by reference herein.

BACKGROUND OF THE DISCLOSURE

1. Field of the Disclosure

The disclosure relates to a driving method, and more particularly to a driving method for a display system.

2. Description of the Related Art

Because cathode ray tubes (CRTs) are inexpensive and provide high definition, they are utilized extensively in televisions and computers. With technological development, new flat-panel displays are continually being developed. When a larger display panel is required, the weight of the flat-panel display does not substantially change when compared to CRT displays. A soft material has been utilized to serve as material in new displays and has become increasingly popular.

BRIEF SUMMARY OF THE DISCLOSURE

Driving methods for a panel structure are provided. The panel structure comprises a substrate, a first electrode layer disposed on the substrate, a first liquid crystal layer disposed on the first electrode layer and displaying a first color, a second electrode layer disposed on the first liquid crystal layer, a second liquid crystal layer disposed on the second electrode layer and displaying a second color, and a third electrode layer disposed on the second liquid crystal layer. An exemplary embodiment of a driving method comprises initializing the first and the second liquid crystal layers; and utilizing a light source to illuminate the first and the second liquid crystal layers such that data is written into at least one of the first and the second liquid crystal layers, wherein the second color is different from the first color.

Display systems are also provided. An exemplary embodiment of a display system comprises a panel structure. The panel structure comprises a substrate, a first electrode layer, a first liquid crystal layer, a second electrode layer, a second liquid crystal layer, a third electrode layer, and a driving module. The first electrode layer is disposed on the substrate. The first liquid crystal layer is disposed on the first electrode layer and displays a first color. The second electrode layer is disposed on the first liquid crystal layer. The second liquid crystal layer is disposed on the second electrode layer and displays a second color. The third electrode layer is disposed on the second liquid crystal layer. The driving module initializes the first and the second liquid crystal layers during an initializing period, and drives a light source to illuminate the first and the second liquid crystal layers after the initializing period.

A detailed description is given in the following embodiments with reference to the accompanying drawings.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

The following description is of the contemplated mode of carrying out the disclosure. This description is made for the purpose of illustrating the general principles of the disclosure and should not be taken in a limiting sense. The scope of the disclosure is determined by reference to the appended claims.

Figure 1:
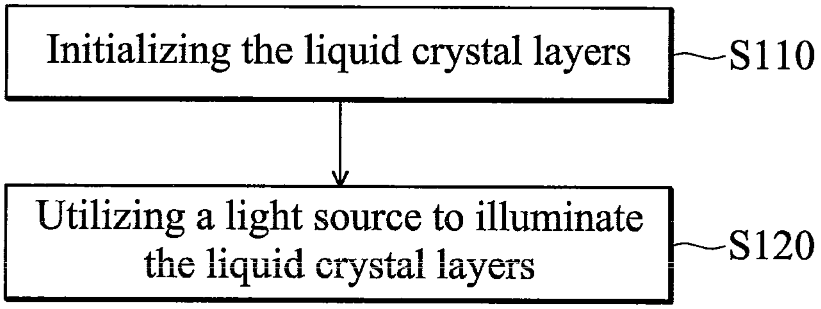
FIG. 1 is a flowchart of an exemplary embodiment of a driving method of the disclosure.
Figure 2:
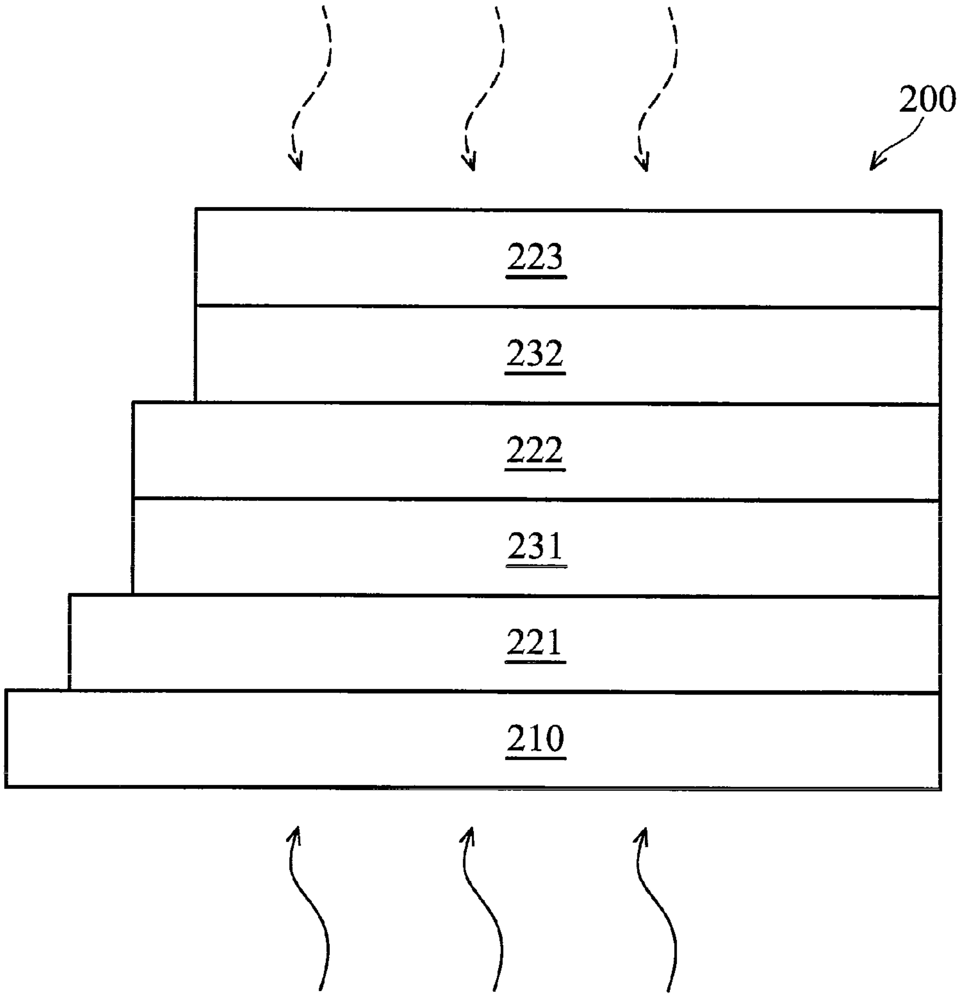
FIG. 2 is a schematic diagram of an exemplary embodiment of a panel structure of the disclosure.

FIG. 1 is a flowchart of an exemplary embodiment of a driving method of the disclosure. The driving method shown in FIG. 1 is applied to a panel structure 200 shown in FIG. 2. Referring to FIG. 2, the panel structure 200 comprises a substrate 210, electrode layers 221~223, and liquid crystal layers 231 and 232.

In one embodiment, the substrate 210 is a poly ethylene terephthalate (PET). The electrode layers 221~223 are disposed on the substrate 210. The material of each electrode layers 221~223 is an indium tin oxide (ITO), but the disclosure is not limited thereto. Additionally, if a photo writing method is utilized to change the states of the liquid crystal layers 231 and 232, the liquid crystal layers 231 and 232 are not required to be patterned.

The liquid crystal layer 231 is disposed between the electrode layers 221 and 222 and is capable of displaying a first color (e.g. a red color, a green color, or a blue color). The liquid crystal layer 232 is disposed between the electrode layers 222 and 223 and is capable of displaying a second color (e.g. a red color, a green color, or a blue color). In this embodiment, the second color is different from the first color. Additionally, the materials of the liquid crystal layers 231 and 232 are bi-stable materials. In one embodiment, the bi-stable material is a cholesteric liquid crystal (ChLC).

The operating principle of the driving method is described in the following. Referring to FIGS. 1 and 2, the liquid crystal layers 231 and 232 are initialized (step S110). In some embodiments, a heating method, a lighting method, or a voltage-exerting method is utilized to initialize the liquid crystal layers 231 and 232.

In one embodiment, the voltages of the electrode layers 221~223 are controlled to initialize the liquid crystal layers 231 and 232. For example, when the voltage difference between the electrode layers 221 and 222 equals to a first voltage, the liquid crystal layer 231 is initialized. When the voltage difference between the electrode layers 222 and 223 equals to a second voltage, the liquid crystal layer 232 is initialized The disclosure does not limit the first and the second voltages. The first voltage is larger than, smaller than, or equal to the second voltage.

Then, a light source is utilized to illuminate the panel structure 200 such that data is written into at least one of the liquid crystal layers (step S120). In this embodiment, the voltage difference between the corresponding electrode layers and/or the exposure energy density equation of the liquid crystal layer is utilized such that each liquid crystal layer can be independently controlled to display color. In addition, when a light source emits light to illuminate the panel structure 200, the liquid crystal layers 231 and 233 absorb the light to generate heat energy. Thus, the state of at least one of the liquid crystal layers 231 and 232 is changed.

For example, the intensity of the emitted light is controlled to control the amount of the heat energy absorbed by the liquid crystal layers. When the heat energy is enough to change the states of the liquid crystal layers 231 and 232, data can be written into the liquid crystal layers 231 and 232. On the contrary, if the heat energy is insufficient to change the states of the liquid crystal layers 231 and 232 and the heat energy is capable of changing the state of the liquid crystal layer 231, data is only written into the liquid crystal layer 231.

Furthermore, if an anti-reflection layer (not shown) is disposed over or under the electrode layer 223, the anti-reflection layer can be a dark layer (DL) or serve as an absorbing layer to increase light absorbing rate.

In other embodiment, data is written into the liquid crystal layers 231 and 232 or data is written only into the liquid crystal layer 231 when a light source illuminates the panel structure 200 and the voltages of the electrode layers 221~223 are controlled. A more detailed description of the above is as follows.

The disclosure does not limit the position of the light source. In this embodiment, the light source illuminates the panel structure 200 from the substrate 210 (i.e. the direction of the emitted light is shown as solid line arrows in FIG. 2). In some embodiments, the light source illuminates the panel structure 200 from the electrode layer 223 (i.e. the direction of the emitted light is shown as dotted line arrows in FIG. 2). Additionally, the emitted light emitted by the light source can be a laser beam which comprises a single wavelength, but is not limited thereto. In other embodiment, the emitted light comprises a plurality of wavelengths. For example, the light source is a light-emitting diode, which emits white light. Further, the emitted light emitted by the light source is a visible light or an invisible light.

Figure 3A:
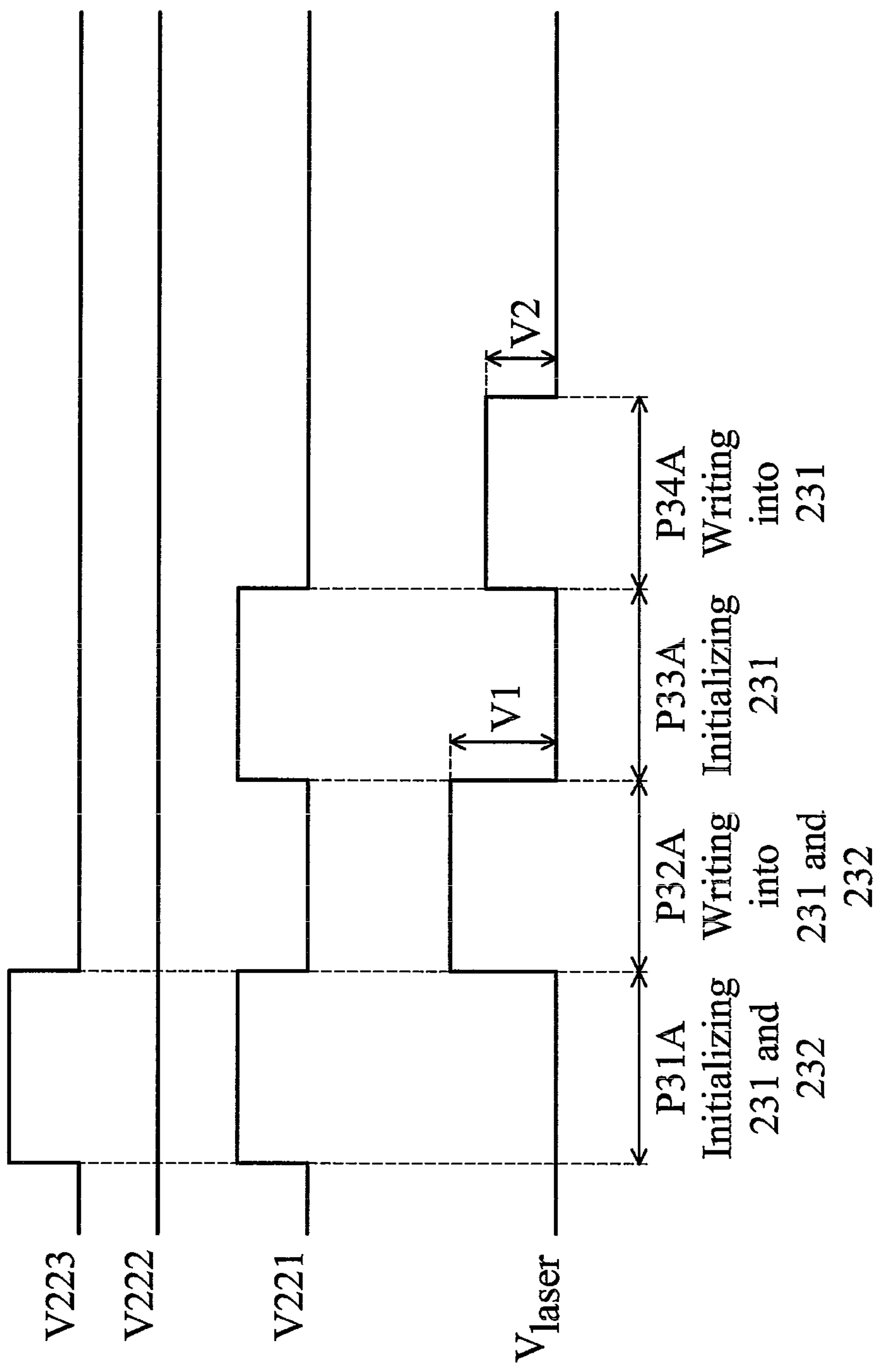
FIG. 3A is a schematic diagram of an exemplary embodiment of the driving method of the disclosure.

FIG. 3A is a schematic diagram of an exemplary embodiment of the driving method of the disclosure. In this embodiment, the intensity of the light emitted by the light source is controlled to write data into the liquid crystal layers 231 and 232 or only into the liquid crystal layer 231. In one embodiment, when the intensity of the emitted light exceeds a preset value, the data is simultaneously written into the liquid crystal layers 231 and 232. When the intensity of the emitted light is less than the preset value, the data is only written into the liquid crystal layer 231.

Referring to FIG. 3A, the symbol V223 represents the voltage of the electrode layer 223. The symbol V222 represents the voltage of the electrode layer 222. The symbol V221 represents the voltage of the electrode layer 221. The symbol $V_{laser}$ represents the intensity of the emitted light emitted by the light source.

During a period P31A, the liquid crystal layers 231 and 232 are initialized. In this embodiment, a voltage difference is generated across the electrode layers 223 and 222 to initialize the liquid crystal layer 232. Similarly, a voltage difference is generated across the electrode layers 222 and 221 to initialize the liquid crystal layer 231. The voltage difference between the electrode layers 223 and 222 is equal to or unequal to the voltage difference between the electrode layers 222 and 221.

During periods P32A and P34A, a light source (e.g. a laser) is utilized to emit a light and the light illuminates the panel structure 200 to write data into at least one of the liquid crystal layers 231 and 232. The position of the light source is fixed. When the intensity of light emitted by the light source is changed, data can be written into at least one of the liquid crystal layers 231 and 232.

During the period P32A, the intensity of the emitted light emitted by the light source is vivid. Thus, the data is simultaneously written into the liquid crystal layers 231 and 232. During the period P34A, the intensity of the emitted light emitted by the light source is weak. Thus, the data is only written into the liquid crystal layer 231. In one embodiment, when the light source illuminates the panel structure 200, the voltages of the electrode layers are the same.

During the period P32A, since the data is simultaneously written into the liquid crystal layers 231 and 232, if the data of the liquid crystal layer 231 is desired to be updated, the data of the liquid crystal layer 231 is required to be eliminated. Thus, a voltage difference is generated across the electrode layers 222 and 221 to initialize (eliminate) the liquid crystal layer 231 during the period P33A. After eliminating the data of the liquid crystal layer 231, the light source emits a weak light to illuminate the panel structure 200. Thus, the new data is only written into the liquid crystal layer 231.

Figure 3B:
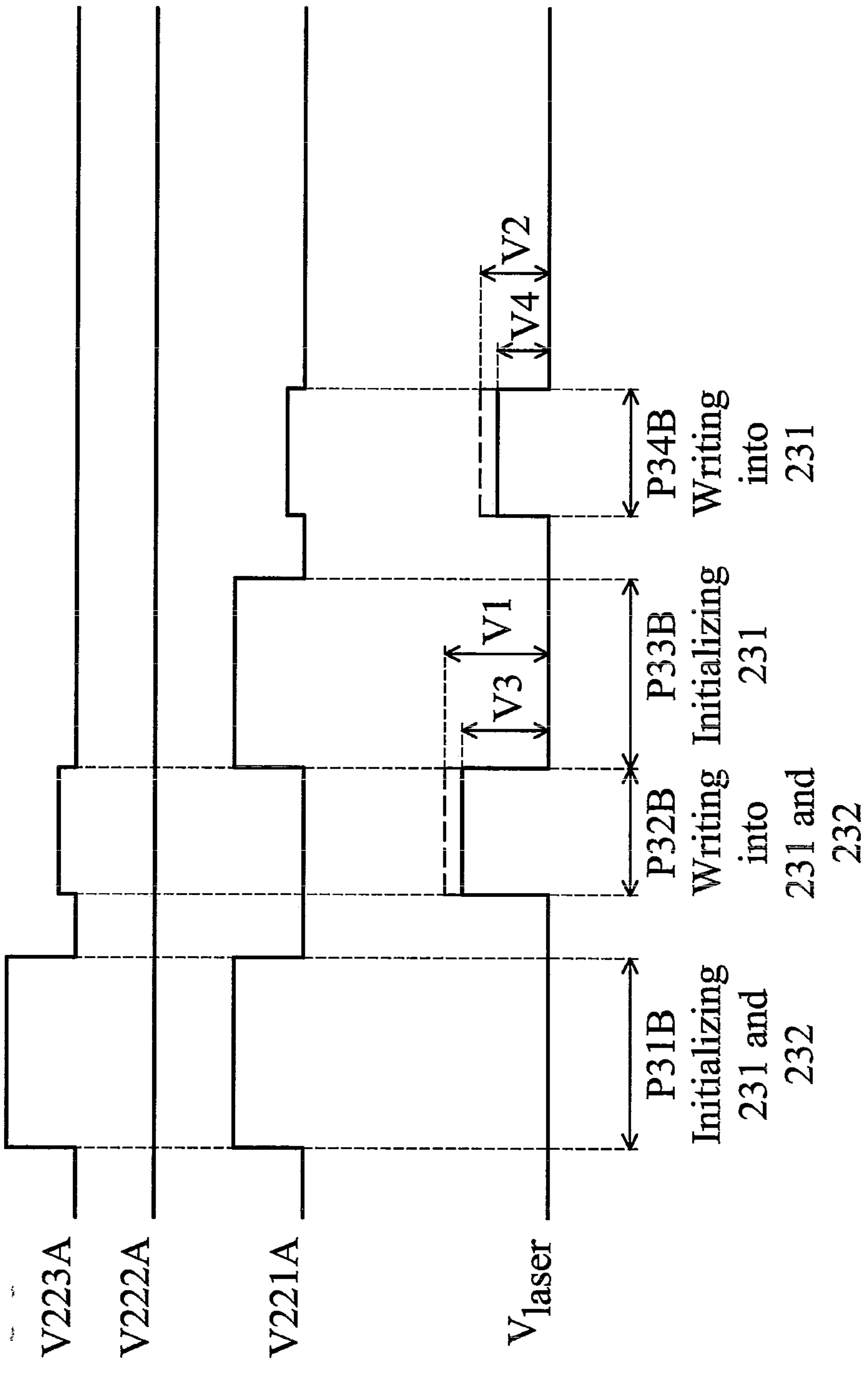
FIG. 3B is a schematic diagram of another exemplary embodiment of the driving method of the disclosure.

FIG. 3B is a schematic diagram of another exemplary embodiment of the driving method of the disclosure. In this embodiment, when the light source illuminates the panel structure 200, the voltage difference is generated across the electrode layers to reduce the intensity of the emitted light. Additionally, the position of the light source is fixed and the direction of the emitted light is fixed.

For example, the intensity of the emitted light is V1 during the period P32A, as shown in FIG. 3A. The intensity of the emitted light is V3 during the period P32B, as shown in FIG. 3B. Since a voltage difference is generated across the electrode layers 223 and 222, the intensity of the emitted light is reduced from V1 to V3. When the voltage difference between the electrode layers 223 and 222 becomes larger, the intensity of the emitted light becomes smaller. Similarly, a voltage difference is generated across the electrode layers 222 and 221 during the period P34B such that the intensity of the emitted light is reduced from V2 to V4.

Figure 3C:
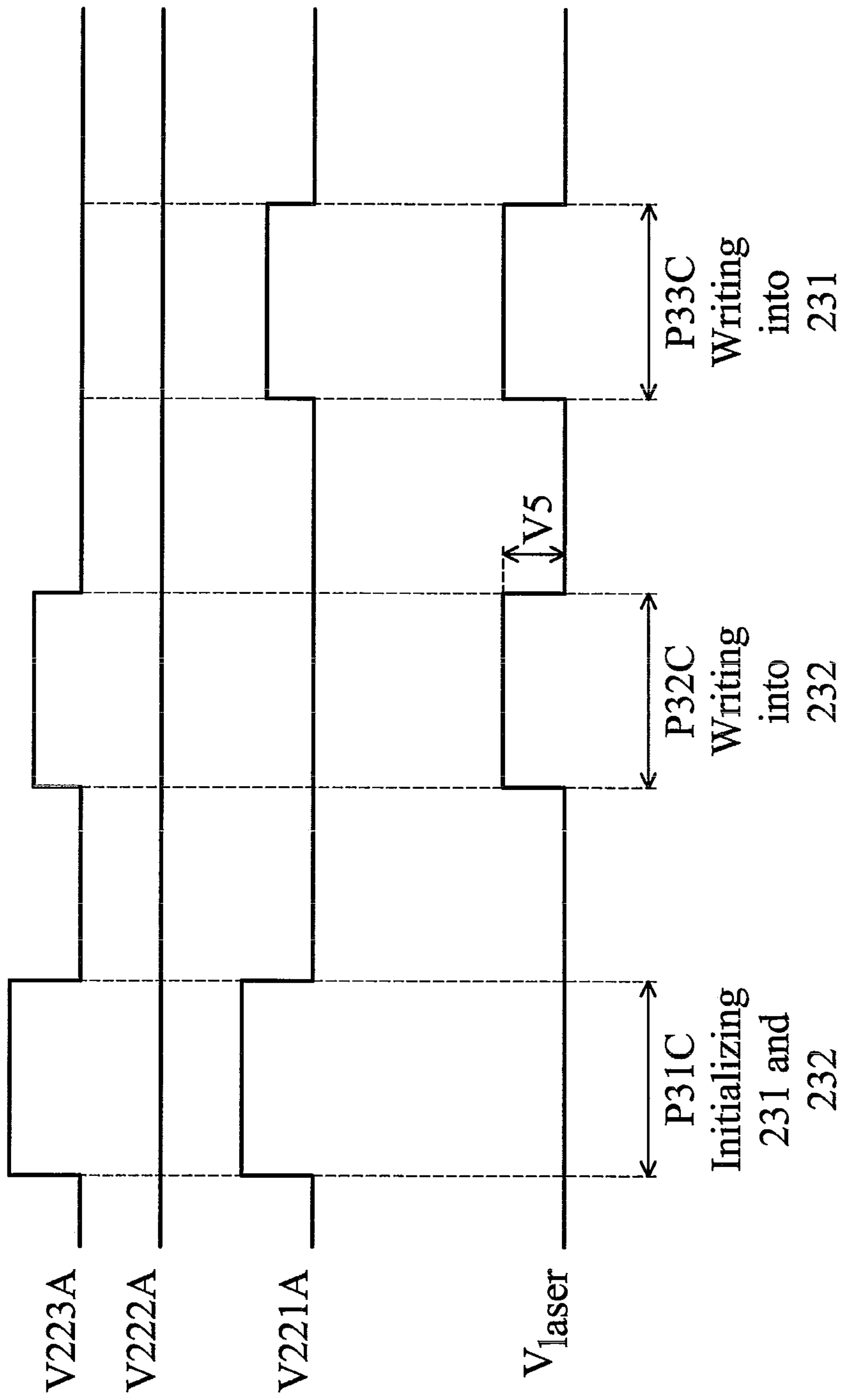
FIG. 3C is a schematic diagram of another exemplary embodiment of the driving method of the disclosure.

FIG. 3C is a schematic diagram of another exemplary embodiment of the driving method of the disclosure. Assuming the intensity of the emitted light is fixed. When the voltage differences between the electrode layers are controlled, data can be written into the corresponding liquid crystal layer. Thus, the initializing step is only executed once in this embodiment. In this embodiment, the position of the light source is fixed and the direction of the emitted light is fixed.

During the period P32C shown in FIG. 3C, when the light source illuminates the panel structure 200, a voltage difference is provided across the electrode layers 223 and 222. The voltage difference between the electrode layers 223 and 222 is adjusted to write data into the liquid crystal layer 232. Similarly, during the period P33C, when the light source illuminates the panel structure 200, a voltage difference is provided across the electrode layers 222 and 221. Thus, data is only written into the liquid crystal layer 231.

In this embodiment, the light intensity during the period P32C is the same as the light intensity during the period P33C. In other embodiments, the light intensity (V5) during the period P32C is higher than, lower than, or equal to the light intensity V3 shown in FIG. 3B. Further, the disclosure does not limit the voltage difference between the electrode layers. In one embodiment, the voltage difference between the electrode layers 223 and 222 is higher than, lower than, or equal to the voltage difference between the electrode layers 222 and 221.

Figure 4:
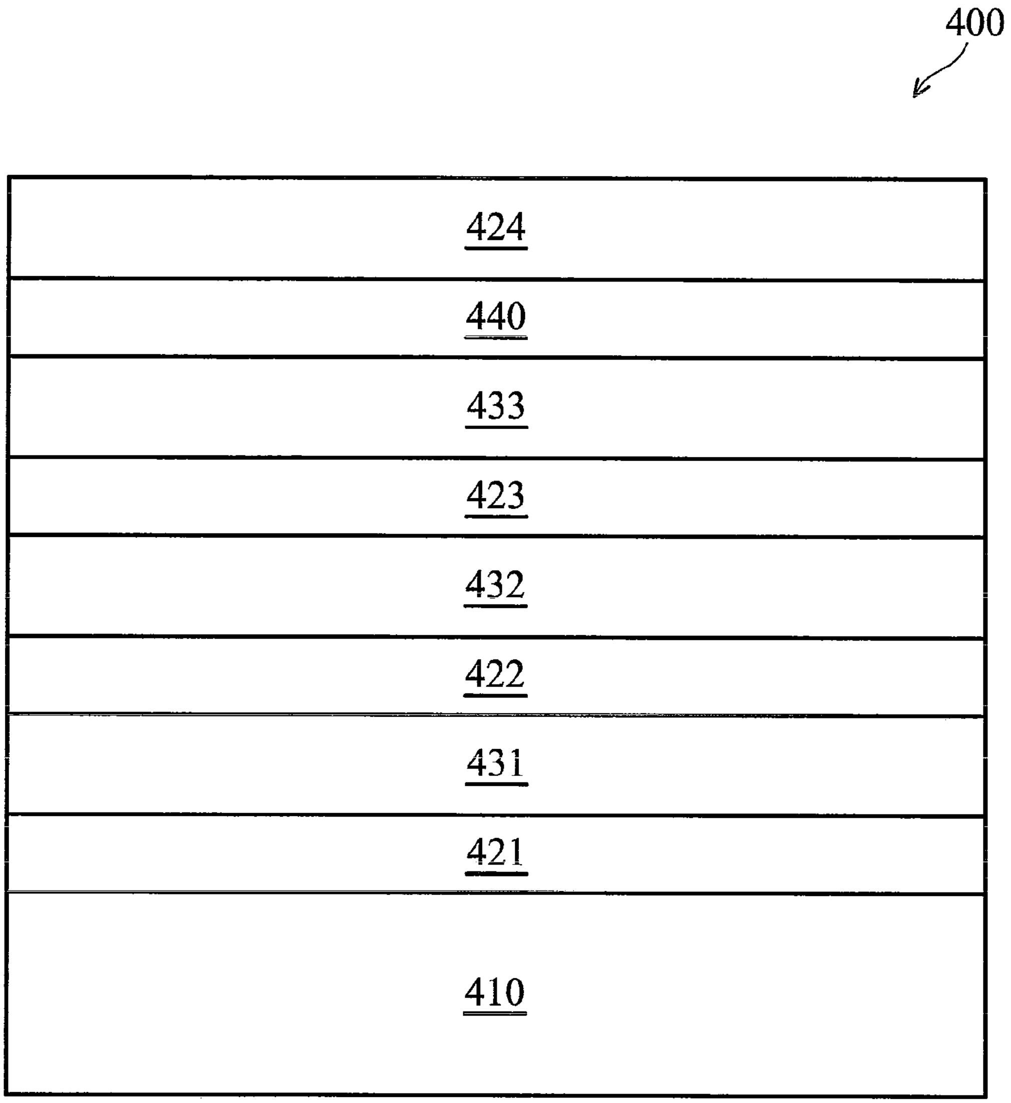
FIG. 4 is a schematic diagram of another exemplary embodiment of the panel structure of the disclosure.

FIG. 4 is a schematic diagram of another exemplary embodiment of the panel structure of the disclosure. The panel structure 400 comprises a substrate 410, electrode layers 421~424, liquid crystal layers 431~433, and an anti-reflection layer 440. The operations of the substrate 410, the electrode layers 421~423 and the liquid crystal layers 431~432 are the same as the substrate 210, the electrode layers 221~223 and the liquid crystal layers 231~232 shown in FIG. 2. Thus, descriptions of the substrate 410, the electrode layers 421~423 and the liquid crystal layers 431~432 are omitted for brevity.

Referring to FIG. 4, the liquid crystal layer 433 is disposed between the electrode layers 423 and 424. The electrode layer 424 is not a designed pattern. The liquid crystal layers 431~433 display different colors. In one embodiment, the liquid crystal layer 431 displays a red color, the liquid crystal layer 432 display a green color, and the liquid crystal layer 433 displays a blue color.

In this embodiment, the anti-reflection layer 440 is disposed between the liquid crystal layer 433 and the electrode layer 424. In one embodiment, the anti-reflection layer 440 is a dark layer or serve as an absorbing layer to increase a light absorbing rate for the liquid crystal layers 431~433. In other embodiments, the anti-reflection layer 440 is disposed over or under the electrode layer 424. In one embodiment, the electrode layer 424 is an Ag electrode, which is opaque.

In this embodiment, a light source emits a light, such as a laser, and the light illuminates the panel structure 400 to write data into at least one of the liquid crystal layers 431~433. The light source emits a light illuminating into the substrate 410 or the electrode layer 424. Assuming the intensity of the emitted light is a first intensity when the emitted light is emitted into the substrate 410, and the intensity of the emitted light is a second intensity when the emitted light is emitted into the electrode layer 424, since a portion of the emitted light is absorbed by the anti-reflection layer 440, the second intensity may exceed the first intensity.

Figure 5A:
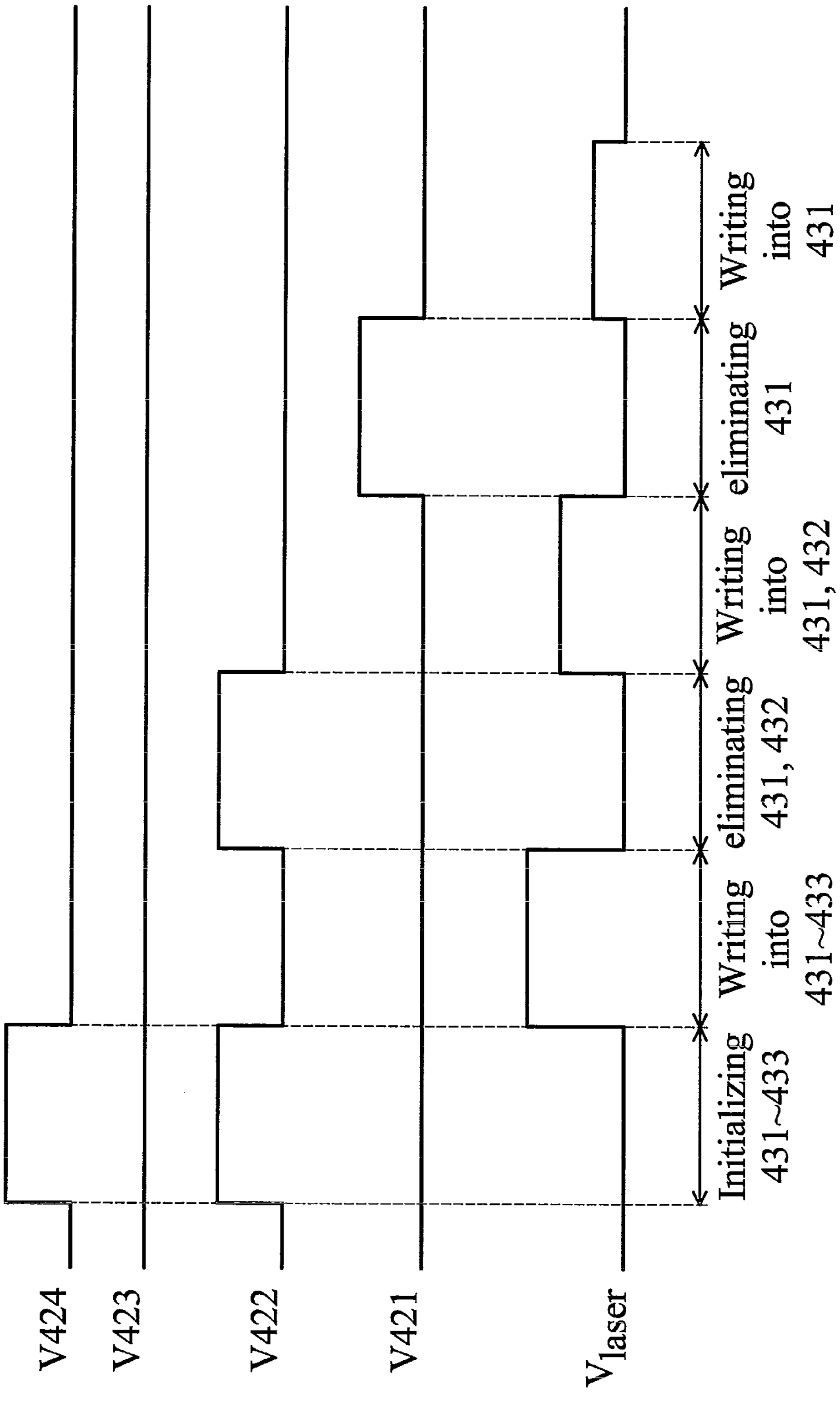
FIGS. 5A~5C are schematic diagrams of other exemplary embodiments of the driving methods of the disclosure.
Figure 5B:
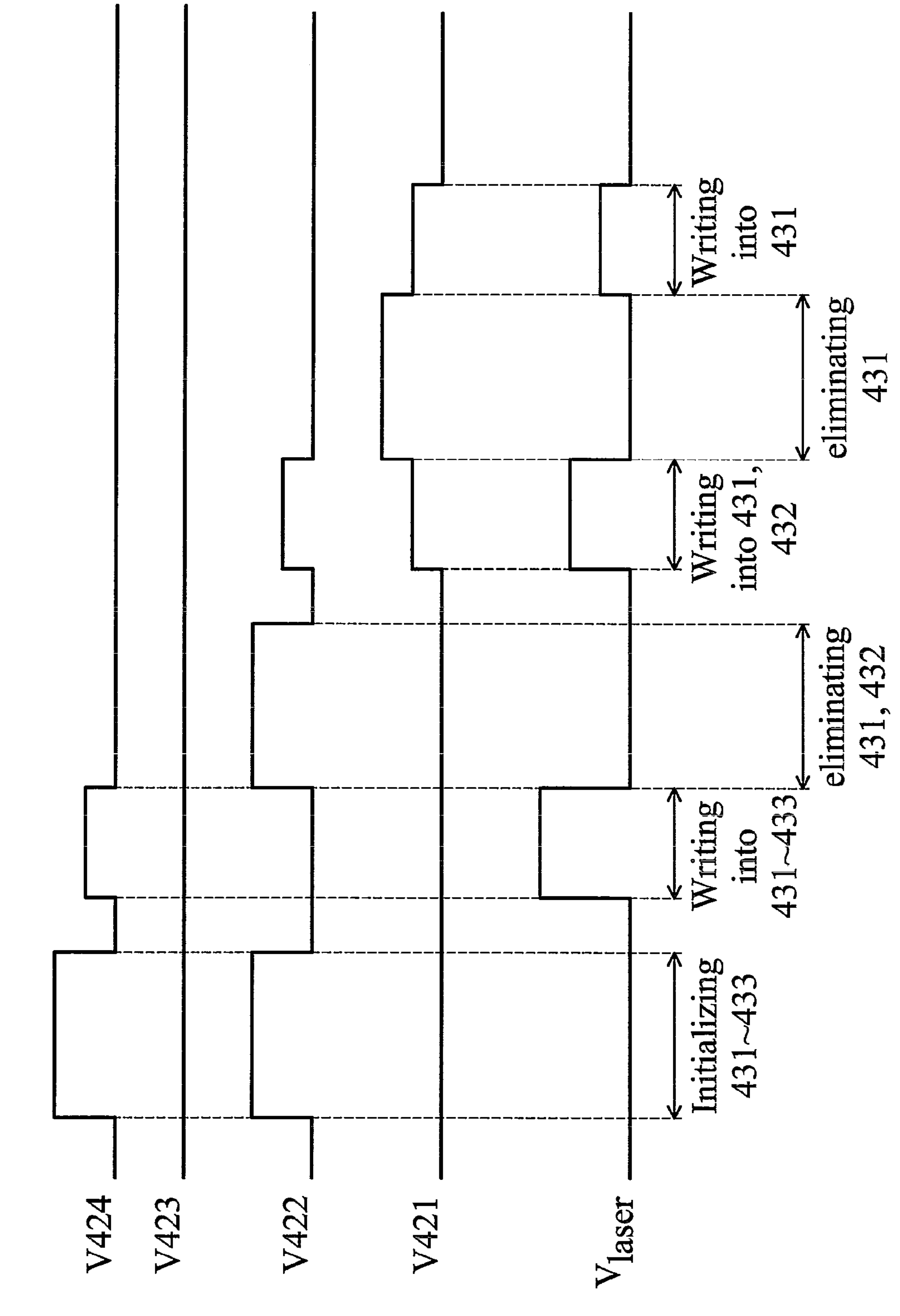
Figure 5C:
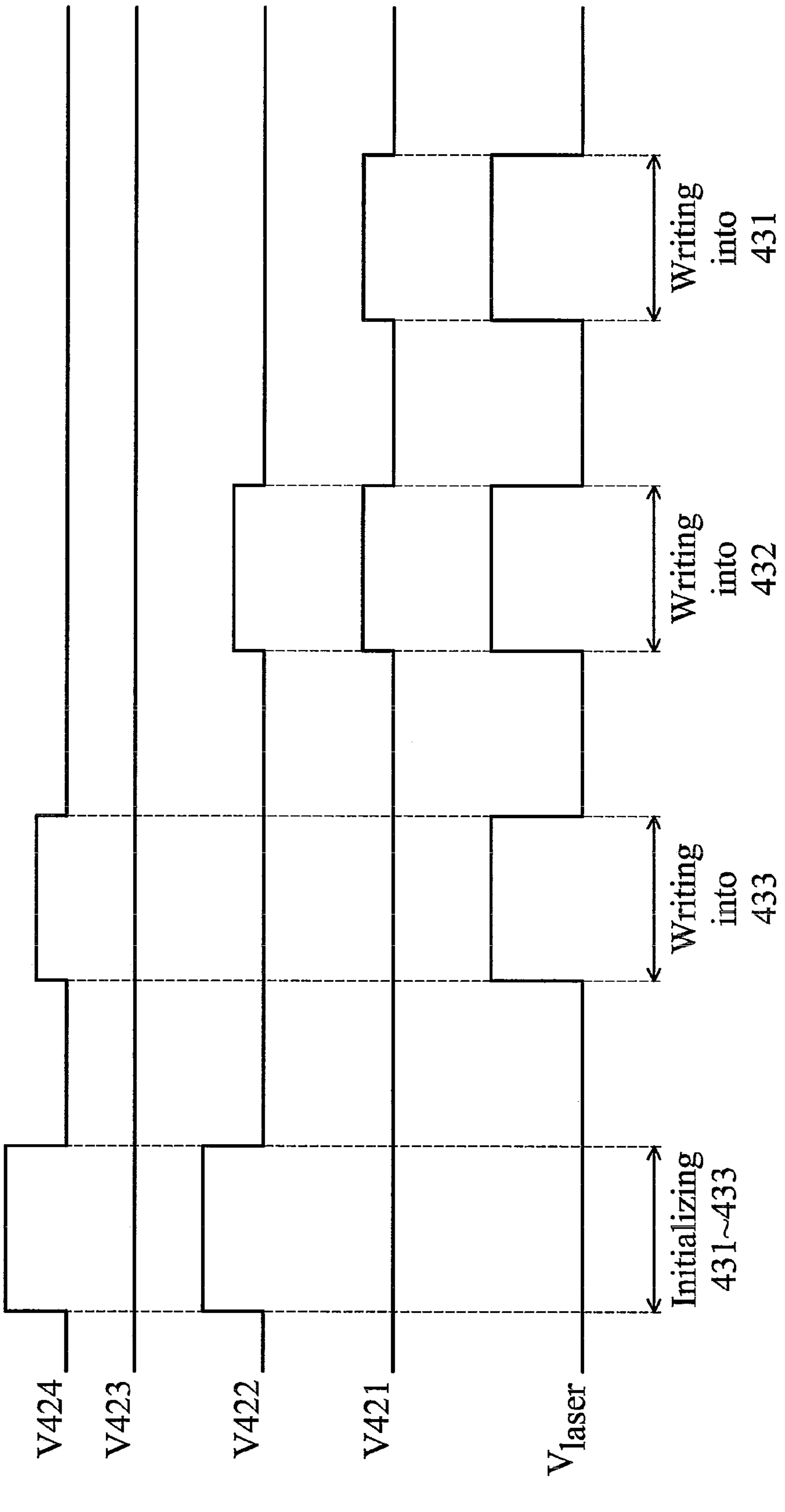

FIGS. 5A-5C are schematic diagrams of other exemplary embodiments of the driving methods of the disclosure. FIGS. 5A-5C are similar to FIGS. 3A-3C with the exception that the driving method shown in FIGS. 5A-5C is applied to the panel structure 400 shown in FIG. 4 and the driving method shown in FIGS. 3A-3C is applied to the panel structure 200 shown in FIG. 2. Since the operations of FIGS. 5A-5C are the same as the operations of FIGS. 3A-3C, the operations of FIGS. 5A-5C are omitted for brevity.

Figure 6A:
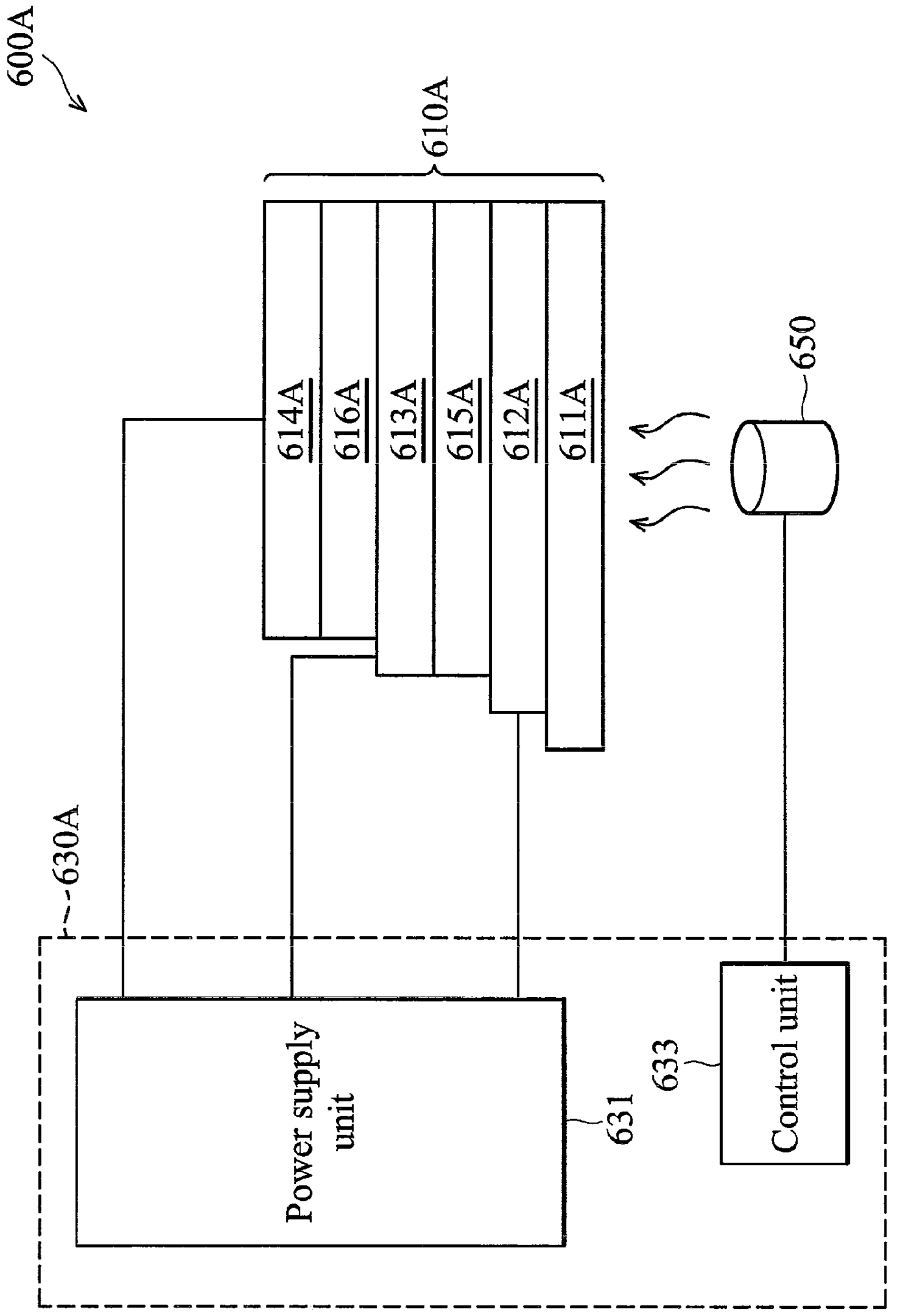
FIG. 6A is a schematic diagrams of an exemplary embodiments of a display system of the disclosure.

FIG. 6A is a schematic diagrams of an exemplary embodiment of a display system of the disclosure. The display system 600A comprises a panel structure 610A, a driving module 630A, and a light source 650. The driving module 630A controls the panel structure 610A and drives the light source 650 such that the light source 650 emits a light to illuminate the panel structure 610A. The panel structure 610A comprises a substrate 611A, electrode layers 612A~614A, and liquid crystal layers 615A and 616A. Since the panel structure 610A is the same as the panel structure 200, the operation of panel structure 610A is omitted for brevity.

The disclosure does not limit the direction of emitting into the panel structure 610A. In one embodiment, the light source 650 emits a light and the direction of the emitted light illuminates into the electrode layer 614A. In this embodiment, the emitted light illuminates into the substrate 611A as shown in FIG. 6A.

The emitted light may be a laser beam, which comprises a single wavelength, but is not limited thereto. In other embodiment, the emitted light comprises a plurality of wavelengths. For example, the light source is a light-emitting diode, which emits white light. Further, the light emitted by the light source is a visible light or an invisible light.

During an initializing period, the driving module 630A initializes the liquid crystal layers 615A and 616A. After the initializing period, the driving module 630A drives the source light 650 to illuminate the panel structure 610A. The disclosure does not limit the initializing method. In one embodiment, the driving module 630A heats the liquid crystal layers 615A and 616A for initializing the liquid crystal layers 615A and 616A. In another embodiment, the driving module 630A drives the source light 650 to illuminate the liquid crystal layers 615A and 616A for initializing the liquid crystal layers 615A and 616A. In other embodiments, the driving module 630A controls the voltage difference among the electrode layers 612A~614A for initializing the liquid crystal layers 615A and 616A.

For example, when a first cross-voltage is provided across the electrode layers 612A and 613A, the liquid crystal layer 615A is initialized. When a second cross-voltage is provided across the electrode layers 613A and 614A, the liquid crystal layer 616A is initialized. In one embodiment, the first cross-voltage is equal to or unequal to the second cross-voltage.

After initializing the liquid crystal layers 615A and 616A, the driving module 630A drives the light source 650 such that the light source 650 emits a light to illuminate the panel structure 610A. Since the liquid crystal layers 615A and 616A are capable of absorbing heat energy, data can be written into each of the liquid crystal layers according to the intensity of the emitted light.

In a first embodiment, data can be written into the liquid crystal layers 615A and 616A according to the intensity of the emitted light emitted by the light source 650. When the generated heat energy is large enough to change the arrangement of the liquid crystal components of the liquid crystal layers 615A and 616A, data can be written into the liquid crystal layers 615A and 616A. If the generated heat energy is only large enough to change the arrangement of the liquid crystal component of the liquid crystal layer 615A, data is only written into the liquid crystal layer 615A.

For example, if the intensity of the emitted light exceeds a present value, data can be simultaneously written into the liquid crystal layers 615A and 616A. If the intensity of the emitted light is less than the present value, data is only written into the liquid crystal layer 615A. In this case, when the light source 650 illuminates the panel structure 610A, the voltages of the electrode layers 612A~614A are the same.

Additionally, if the data of the liquid crystal layer 615A is required to be eliminated, the liquid crystal layer 615A is initialized before writing data into the liquid crystal layer 615A. In one embodiment, the driving module 630A provides a voltage difference across the electrode layers 612A and 613A to initialize the liquid crystal layer 615A In a second embodiment, when the light source 650 illuminates the panel structure 610A, the voltages of the electrode layers are controlled. In the first embodiment, when the light source 650 illuminates the panel structure 610A, the voltages of the electrode layers 612A~614A are the same. In the second embodiment, the light source 650 illuminates the panel structure 610A, and a voltage difference is provided across the electrode layers 612A~614A to reduce the intensity of the emitted light emitted by the light source 650.

For example, when the intensity of the emitted light is V1, data can be simultaneously written into the liquid crystal layers 615A and 616A in the first embodiment. When the intensity of the emitted light is V2 less than V1, data is only written into the liquid crystal layer 615A in the first embodiment. In the second embodiment, when the intensity of the emitted light is V3 and a voltage difference is provided across the electrode layers 613A and 614A, data can be simultaneously written into the liquid crystal layers 615A and 616A. When the intensity of the emitted light is V4 and a voltage difference is provided across the electrode layers 612A and 613A, data is only written into the liquid crystal layer 615A.

If data is desired to be written into the liquid crystal layer 616A, since a voltage difference is provided across the electrode layers 613A and 614A, the intensity of the emitted light is reduced from V1 to V3. Similarly, if data is desired to be written into the liquid crystal layer 615A, since a voltage difference is provided across the electrode layers 612A and 613A, the intensity of the emitted light is reduced from V2 to V4. Further, if the liquid crystal layer 615A is desired to be updated (eliminated), the liquid crystal layer 615A is initialized before writing data into the liquid crystal layer 615A.

In a third embodiment, when the light source 650 illuminates the panel structure 610A, the driving module 630A controls the voltages across the electrode layers 612A~614A to write data into the corresponding liquid crystals. For example, when the light source 650 emits a light to illuminate the panel structure 610A and the intensity of the emitted light is a preset intensity, if a voltage difference is provided across the electrode layers 613A and 614A, data is only written into the liquid crystal layer 616A.

Similarly, when the light source 650 again illuminates the panel structure 610A and the intensity of the emitted light is the preset intensity, if a voltage difference is provided across the electrode layers 612A and 613A, data is only written into the liquid crystal layer 615A. In the third embodiment, since the data is only written into the liquid crystal layer 616A, the liquid crystal layer 615A is not required to be initialized if data is desired to be written into the liquid crystal layer 615A.

To control voltages of the electrode layers 612A~614B, the driving module 630A comprises a power supply unit 631. The driving module 630A further comprises a control unit 633 to drive the light source 650 and control the intensity of the emitted light.

Figure 6B:
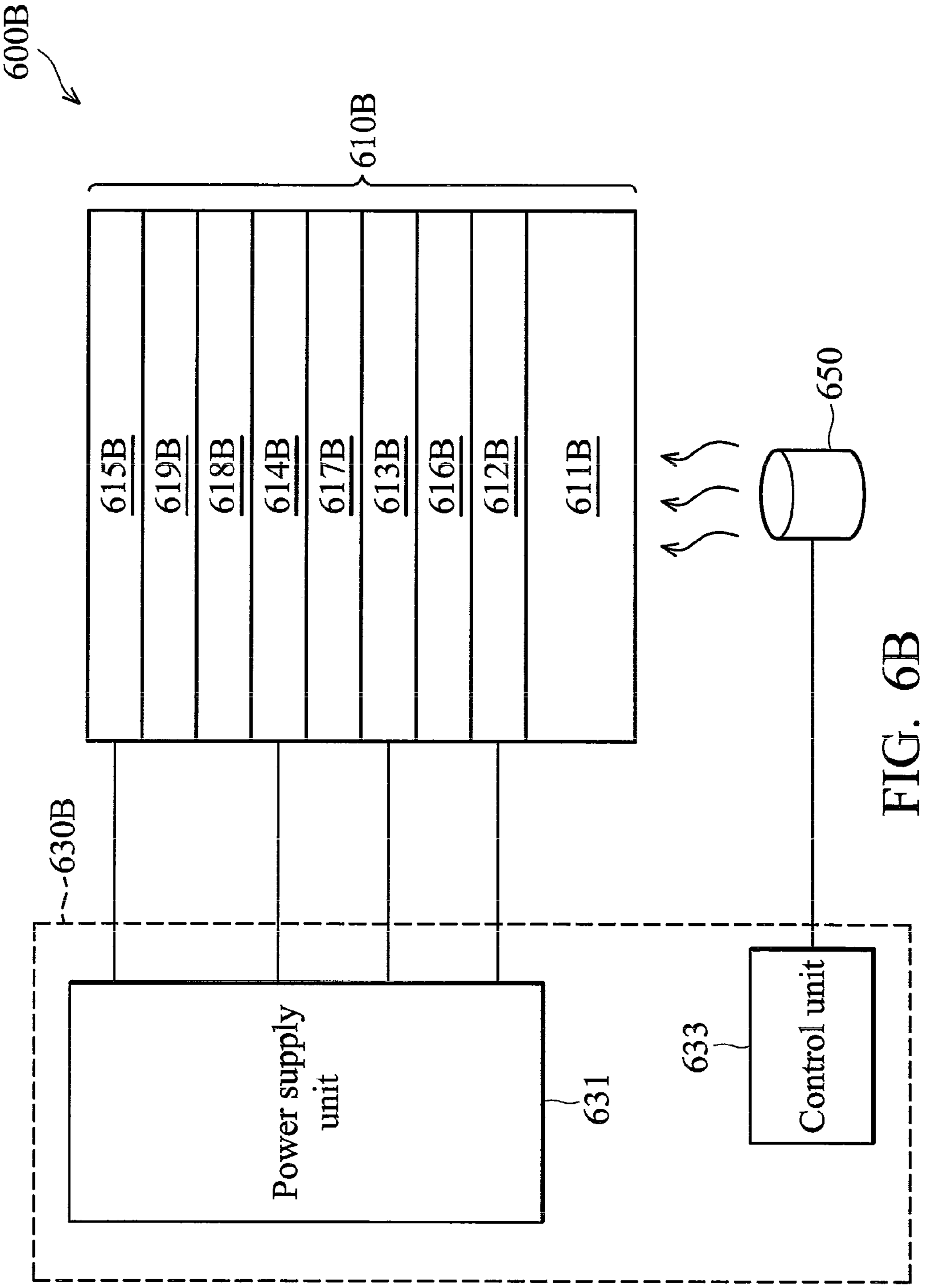
FIG. 6B is a schematic diagrams of another exemplary embodiments of a display system of the disclosure.

FIG. 6B is a schematic diagram of another exemplary embodiments of a display system of the disclosure. FIG. 6B is similar to FIG. 6A except for the panel structure 610B. The panel structure 610B comprises a substrate 611B, electrode layers 612B~615B, liquid crystal layers 616B, 618B, and an anti-reflection layer 619B. Since the operations of the panel structures 400 and 610B are the same, the description of the panel structure 610B is omitted for brevity.

Data can be written into a corresponding liquid crystal layer according to the intensity of the emitted light. In this case, when a light source illuminates a panel structure, the voltages of all electrode layers are the same. Additionally, since data may be simultaneously written into two liquid crystal layers, if the data of one liquid crystal layer is desired to be updated, the required liquid crystal layer is first required to be eliminated.

When the light source illuminates the panel structure, if the voltage of the electrode layers are controlled, the intensity of the emitted light can be reduced. In this case, when the light source illuminates the panel structure, the voltages of the electrode layers may be different. Additionally, if the direction of illuminating the panel structure is fixed, data can be written into a corresponding liquid crystal layer according to the voltage of the electrode layers. In this case, since the data is only written into the corresponding liquid crystal layer, the data of the other liquid crystal layers are not to be eliminated.

While the disclosure has been described by way of example and in terms of the embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving method for a panel structure comprising a substrate, a first electrode layer disposed on the substrate, a first liquid crystal layer disposed on the first electrode layer and displaying a first color, a second electrode layer disposed on the first liquid crystal layer, a second liquid crystal layer disposed on the second electrode layer and displaying a second color, and a third electrode layer disposed on the second liquid crystal layer, comprising:

initializing the first and the second liquid crystal layers;

utilizing a light source to illuminate the first and the second liquid crystal layers such that data is written into at least one of the first and the second liquid crystal layers, wherein the second color is different from the first color;

during a first period, utilizing the light source to illuminate the panel structure, wherein the light source emits a light comprising a first intensity, controlling the voltages of the first and the second electrode layers such that the voltages of the first and the second electrode layers are the same, and controlling the voltages of the second and the third electrode layers such that the voltages of the second and the third electrode layers are different, and during a second period, utilizing the light source to illuminate the panel structure, wherein the light comprises a second intensity, controlling the voltages of the first and the second electrode layers such that the voltage of the first electrode layer is different from the voltage of the second electrode layer, and controlling the voltages of the second and the third electrode layers such that the voltages of the second and the third electrode layers are the same.

2. The driving method as claimed in claim 1, wherein the light source emits a light comprising a plurality of wavelengths.

3. The driving method as claimed in claim 1, wherein the light source emits a light comprising a single wavelength.

4. The driving method as claimed in claim 3, wherein the light emitted by the light source is a laser.

5. The driving method as claimed in claim 1, wherein the initializing step is illuminating the first and the second liquid crystal layers.

6. The driving method as claimed in claim 1, wherein the initializing step comprises:

providing a first cross-voltage across the first and the second electrodes layers for initializing the first liquid crystal layer; and providing a second cross-voltage across the second and the third electrode layers for initializing the second liquid crystal layer.

7. The driving method as claimed in claim 6, wherein the first cross-voltage is equal to the second cross-voltage.

8. The driving method as claimed in claim 1, wherein the light source emits a light illuminating the panel structure from the third electrode layer.

9. The driving method as claimed in claim 1, wherein the light illuminates the panel structure from the substrate.

10. The driving method as claimed in claim 9, wherein when the intensity of the light exceeds a preset value, data is simultaneously written into the first and the second liquid crystal layers, and when the intensity of the light is less than the preset value, data is only written into the first liquid crystal layer.

11. The driving method as claimed in claim 10, wherein when the data is simultaneously written into the first and the second liquid crystal layers, if new data is desired to be written into the first liquid crystal layer, the data written into first liquid crystal layer is required to be eliminated.

12. The driving method as claimed in claim 11, wherein when the light source illuminates the panel structure, the voltages of the first, the second, and the third electrode layers are the same.

13. The driving method as claimed in claim 10, wherein when the data is written into the first and the second liquid crystal layers or written into the first liquid crystal layer, the illuminating direction of the light source is fixed.

14. The driving method as claimed in claim 1, wherein when the first intensity exceeds the second intensity, data is simultaneously written into the first and the second liquid crystal layers during the first period, and data is only written into the first liquid crystal layer during the second period.

15. The driving method as claimed in claim 14, wherein during a third period, the first liquid crystal layer is eliminated, wherein the third period is located between the first and the second periods.

16. The driving method as claimed in claim 1, wherein when the first intensity is equal to the second intensity, data is only written into the second liquid crystal layer during the first period, and data is only written into the first liquid crystal layer during the second period.

17. The driving method as claimed in claim 1, wherein the illuminating direction of the light source is fixed during the first and the second periods.

18. The driving method as claimed in claim 1, wherein the materials of the first and second liquid crystal layers are bi-stable materials.

19. The driving method as claimed in claim 18, wherein the bi-stable material is a cholesteric liquid crystal (ChLC).

20. The driving method as claimed in claim 1, wherein the first, the second, and the third electrode layers are not a designed pattern.

21. The driving method as claimed in claim 1, further comprising:

forming an anti-reflection layer such that the amount of heat energy, absorbed by the first and the second liquid crystal layers, is increased, wherein the heat energy is provided by the light source.

22. The driving method as claimed in claim 21, wherein the anti-reflection layer is disposed over or under the third electrode layer.

23. The driving method as claimed in claim 1, wherein the first and the second liquid crystal layers are initialized, and simultaneously, a third liquid crystal layer is initialized, wherein the third liquid crystal layer is disposed on the third electrode layer and displays a third color, a fourth electrode layer is disposed on the third liquid crystal layer, and the first, the second and the third colors are different.

* * * * *